US007093235B2

(12) United States Patent
Andrews et al.

(10) Patent No.: US 7,093,235 B2
(45) Date of Patent: Aug. 15, 2006

(54) PROCESS FOR MEASURING CODING PRODUCTIVITY

(75) Inventors: Herrick J. Andrews, Redmond, WA (US); Maxim V. Stepin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 10/319,085

(22) Filed: Dec. 13, 2002

(65) Prior Publication Data

US 2004/0117761 A1 Jun. 17, 2004

(51) Int. Cl.
*G06F 9/44* (2006.01)
(52) U.S. Cl. .................................. 717/124; 717/126
(58) Field of Classification Search ................ None
See application file for complete search history.

(56) References Cited

U.S. PATENT DOCUMENTS

| 5,293,629 | A  | * | 3/1994  | Conley et al. ............... 717/154 |
| 6,275,223 | B1 | * | 8/2001  | Hughes ........................ 715/751 |
| 6,609,216 | B1 | * | 8/2003  | Almy et al. ................... 714/25 |
| 6,836,884 | B1 | * | 12/2004 | Evans et al. .................. 717/140 |
| 2002/0023257 | A1 | * | 2/2002  | Charisius et al. .............. 717/2 |
| 2002/0066077 | A1 | * | 5/2002  | Leung ........................ 717/126 |

OTHER PUBLICATIONS

Watt S. Humphrey, The Personal Software Process, CMU/SEI-2000-TR-022, [retrieved on Oct. 4, 2005], Carnegie Mellon university, retrieved from the internet <URL:http://www.sei.cmu.edu/pub/documents/00.reports/pdf/00tr022.pdf, pp. 1-55.*
Thomas Ball, Stephen G.Eick, Software Visualization in the Large [online], Apr. 1996, [retrieved on Oct. 8, 2005], IEEE, vol. 29 No. 4, retrieved from the internet: <URL: http://doi.ieeecomputersociety.org/10.1109/2.488299, pp. 33-43.*
Stepehn J Webster, Changed, Added and Deleted SLOC: A Simple Example [online], Aug. 3, 2001, [retrieved on Oct. 6, 2005], Power Software, retrieved from the Internet: <URL: http://www.powersoftware.com/pm/pm_chg_ex.pdf, pp. 1-5.*
Wohlin, C., et al., "Defect Content Estimations from Review Data", *in Proceedings of the 1998 International Conference on Software Engineering*, pp. 400-409, (Apr. 19-25, 1998) Kyoto, Japan.
Petersson, H, et al., "An Empirical Study of Experience-Based Software Defect Content Estimation Methods, *In Proceedings of $10^{th}$ International Symposium on Software Reliability Engineering*", pp. 126-135, (Nov. 1-4, 1999) Boca Raton, Florida.

(Continued)

*Primary Examiner*—Tuan Dam
*Assistant Examiner*—Andrew Y. Chou
(74) *Attorney, Agent, or Firm*—Lee & Hayes, PLLC

(57) ABSTRACT

A novel system and method provides a concrete relative measure for evaluating coding quality. The novel system and method do not rely on bug counting. Instead, the number of defective lines of code is compared to a total number of opportunities to create such defects. A defective line is a line that is deleted, added or changed subsequent to drafting of the prior version of the code. In an embodiment, a deletion and an addition are each treated as single defects, while modification of a line of code is treated as two defects. In this way, regardless of whether modification is viewed as deletion followed by addition, or rather simply a single step of modification, the number of defects in either case is the same.

22 Claims, 8 Drawing Sheets

OTHER PUBLICATIONS

Wohlin, C. et al., "Defect Content Estimation for Two Reviewers", *In Proceedings of 12th International Symposium on Software Reliability Engineering*, pp. 340-345, (Nov. 2001) Hong Kong, China.

Weigers, Karl E., "Seven Truths About Peer Reviews" *Cutter IT Journal*, vol. 15, No. 7, pp. 31-37 (Jul. 2002).

* cited by examiner

201

CODE CHECK-IN

LINE A pkjfkjhskfjhlkdsf[oiuroiu]aoiuflkjsd

LINE B kjdfkjdkfjhdkjfhlkjewpiuygriu-

LINE C odijfnvokdjnkjnodfvngdcnlkgph

LINE D oiuhbviuhbewfhubwiufhbvcfhukwf

LINE E bvoljegbwpeiormclkdw;l;oqrueh

LINE F kjgfkjlerkjrghrkjncnhlt uerkjurn

LINE G oweirgnbriuhreioewrgioerhj

FIGURE 2A

PROCESS FOR MEASURING CODING PRODUCTIVITY

TECHNICAL FIELD

This invention relates generally to the technology of computer software generation and, more particularly, relates to a system and method for measuring the productivity or efficiency of a computer programmer and/or programming team.

BACKGROUND OF THE INVENTION

As computers and computing devices have become a prevalent part of modern life, the ability to produce appropriate software for these devices has increased in importance. In order to economically produce quality software in a timely fashion, it is often desirable to measure and evaluate the productivity or efficiency of individuals/teams who are responsible for drafting or otherwise controlling the generation of software (hereinafter collectively referred to as "developers"). For example, software that is especially defective may require extensive effort and time to reach production in final form, whereas software that is relatively error free may be marketed with confidence in less time using less effort. In general, inefficient or unproductive developers can cost companies a significant amount of resources due to excess development costs, lost market opportunities, and so forth. Additionally, the instability introduced into the code as a result of rework on the code contributes to reducing the quality of the product.

In other industries, it has long been common to evaluate employee performance by evaluating the quality of the employee's product. For example, an autoworker's skills can be evaluated by examining the quality or performance of a completed automobile, and a chef's proficiency in the kitchen can be judged by the taste and presentation of a meal. However, the software industry presents unique challenges in this regard.

In order to provide accountability for poor developers and rewards for proficient developers, as well as to adjust critical processes, the software industry has long sought an effective measure by which to judge developer skill and performance. A number of such measures have been implemented in the past, however, each such measure has had drawbacks that have prevented widespread adoption and industry satisfaction. For example, one such system involves using the number of bugs found in code, often phrased as bugs per thousand lines of code, or bugs per KLOC, to measure the productivity of the developer. This measure has met with great resistance from developers for a number of reasons. Primary among its drawbacks is the general inability to easily and accurately distinguish bugs that required extensive revision from bugs that could be simply and quickly fixed. For example, some bugs require only that one character be changed, whereas others require many thousands of code lines to be changed. Treating all bugs the same thus introduces significant inaccuracy into the productivity measurement process. Moreover, developers often feel that using bug counting as a productivity measure unfairly favors developers working on simple problems to the detriment of those working on more complex issues. While managers and others who oversee large numbers of developers may feel that the laws of large numbers result in overall statistical accuracy of this measure, that does not operate to alleviate the unfairness of the measure as applied to individuals. Moreover, for those developers so inclined, the bug counting measure is fairly easy to "game" or manipulate in the developer's favor.

Other means of measuring developer productivity have been implemented as well to some extent in the industry. However, none has attained a level of fairness and accuracy sufficient to develop widespread developer support and endorsement. If a particular system for measuring coding productivity does not meet with relatively wide spread developer support, then it will be difficult to use such a system to drive improved productivity. Accordingly, a system and method for accurately and fairly measuring developer productivity is needed.

SUMMARY OF THE INVENTION

A novel system and method are described for measuring the productivity of code developers by measuring the "churn" or code modification activities necessitated during the code development process. Unlike prior systems, the system and method presented herein does not rely on a ratio of the number of bugs, or separable functional coding errors, to the number of lines of code. Rather, the number of defective lines of code is compared to a total number of opportunities to create such defects. Generally speaking, in an embodiment of the invention, a defective line of code is a line of code that needs to be "changed" subsequent to drafting of a version of the code due to being erroneous (including erroneous omission). Such change may occur as the addition of a new line, deletion of an existing line, or modification of an existing line, for example.

In a further embodiment of the invention, a deletion of a line of code or an addition of a line of code are treated as single defects, whereas the modification of a line of code is treated as two defects. In this way, regardless of whether the modification of a line is viewed as the deletion of an old line followed by the addition of a new line, or rather simply as a single step of altering the line, the number of defects in either case is the same.

In a further embodiment, a defect severity measure is not used. Rather, line defects are classified simply as either being severe enough to require change, or benign enough to not require change. Since line defects are evaluated instead of bugs, a severe bug requiring changes in a great number of lines of code will reflect more defects than a mild bug requiring changes to only a small number of lines of code. The nature of the described system typically makes it difficult to "game" or manipulate in the developer's favor in many implementations.

In an embodiment of the invention, types of code work are classified into drafting activities that are directed to fixing bugs and other drafting activities that are not so directed. For example, work done to add a feature ("feature work") is not directed to bug fixing. Code changes that are not directed to mitigating a bug or bugs can be excluded from the error analysis in terms of the errors contained in that particular code. Nonetheless, the resultant lines of code present opportunities for defects relative to the subsequent version of the code. Drafters may sometimes deliver code versions that are the result of multiple types of work, such as code that is the result of work aimed at both fixing bugs and adding one or more features. In such a case, it is desirable to discount the changes to the code to reflect the percentage of the code that is directed to bug fixing.

Other features and advantages of various embodiments of the invention will become apparent from the detailed description set forth hereinafter.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 2A–D are schematic diagrams showing example code in an original state and in three different modified states respectively;

DETAILED DESCRIPTION OF THE INVENTION

Figure 1:
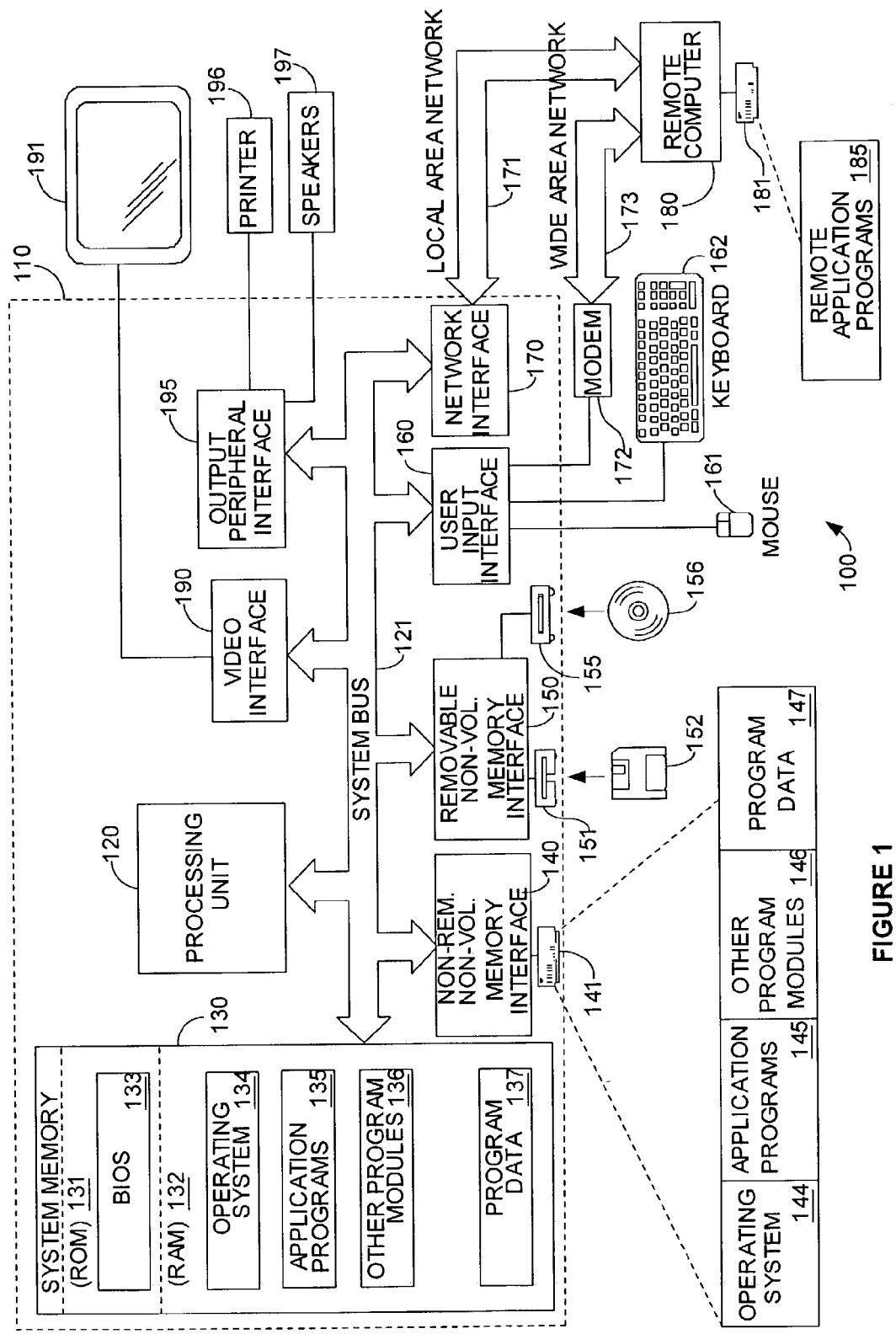
FIG. 1 is a block diagram generally illustrating an exemplary computer system usable in an implementation of an embodiment of the invention.

In order to improve a production process, such as for making software, it is important to be able to fairly and accurately measure the quality of the process. For example, the well-known Six Sigma approach to quality management entails measuring and improving a process until the number of output defects is so small that the probability of a defect approaches zero; or the equivalent of six standard deviations (sigmas) from the mean, translating roughly to an error rate of 3.4 defects per million opportunities for defects. Not only is defect measurement important to derive such a sigma value, it is also important as a way to actually improve the measured process. However, as noted above, it has traditionally been difficult to accurately derive a measure of coding quality or defectiveness. Herein, a system and method are described for producing a concrete numerical value that can be used to provide a relative measure of coding productivity, and hence to improve production and development processes and to appropriately motivate developers and others who are involved in the code development process. The end result will typically be higher quality code.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may be used in a networked environment and may further be practiced in distributed computing environments wherein tasks are performed by remote processing devices that are linked through a communications network. In a distributed computing environment, program modules may be located in one or both of local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be implemented by way of numerous other general purpose or special purpose computing system environments or configurations. Examples of well known computing systems, environments, and/or configurations that are suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from and/or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A dedicated monitor 191 or other type of display device may also be connected to the system bus 121 via an interface, such as a video interface 190. In addition to the monitor, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a router, a network PC, a peer device or other common network node. The remote computer or computers typically include many or all of the elements described above relative to the personal computer 110, although only a memory storage device 181 has been illustrated in FIG. 1, and although it will be appreciated that in some cases the remote computer can lack much of the functionality contained in the computer 110. The logical connections depicted in FIG. 1 include a local area network (LAN) 171 and a wide area network (WAN) 173, but the computer 110 may additionally or alternatively use one or more other networking environments. For example, the computer 110 may reside on an ad hoc network via a communications interface such as a wireless interface. Networking environments of all types are commonplace in offices, enterprise-wide computer networks, intranets and the Internet.

The computer 110 typically includes facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. Similarly, when used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism.

In a networked environment, program modules depicted relative to the personal computer 110 such as in FIGS. 2–5 may be stored wholly or partially in a remote memory storage device as discussed above. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention, when used in a network environment, to use in a permanent network infrastructure, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

FIGS. 2A–D are simplified diagrams showing example code in an original state and in three different modified states respectively. These figures are intended to illustrate the types of changes that may be made in code from draft version to draft version. For example, the code generation process may consist of a series of check-ins, where each check-in delivers an updated version of the code. Thus in FIG. 2A, the example code 201 can be viewed as corresponding to the code at a first check-in, while FIGS. 2B–D correspond to potential states of the code 203, 205, 207 upon subsequent check-ins. A salient feature of these diagrams is that there exist at least two reference points in time for a body of code from which churn, and hence code developer productivity, can be evaluated. Although in an embodiment of the invention more than two versions of the code are evaluated to make a quality determination (see summation expression below), this example will proceed with respect to two such versions for simplicity.

Figure 2B:
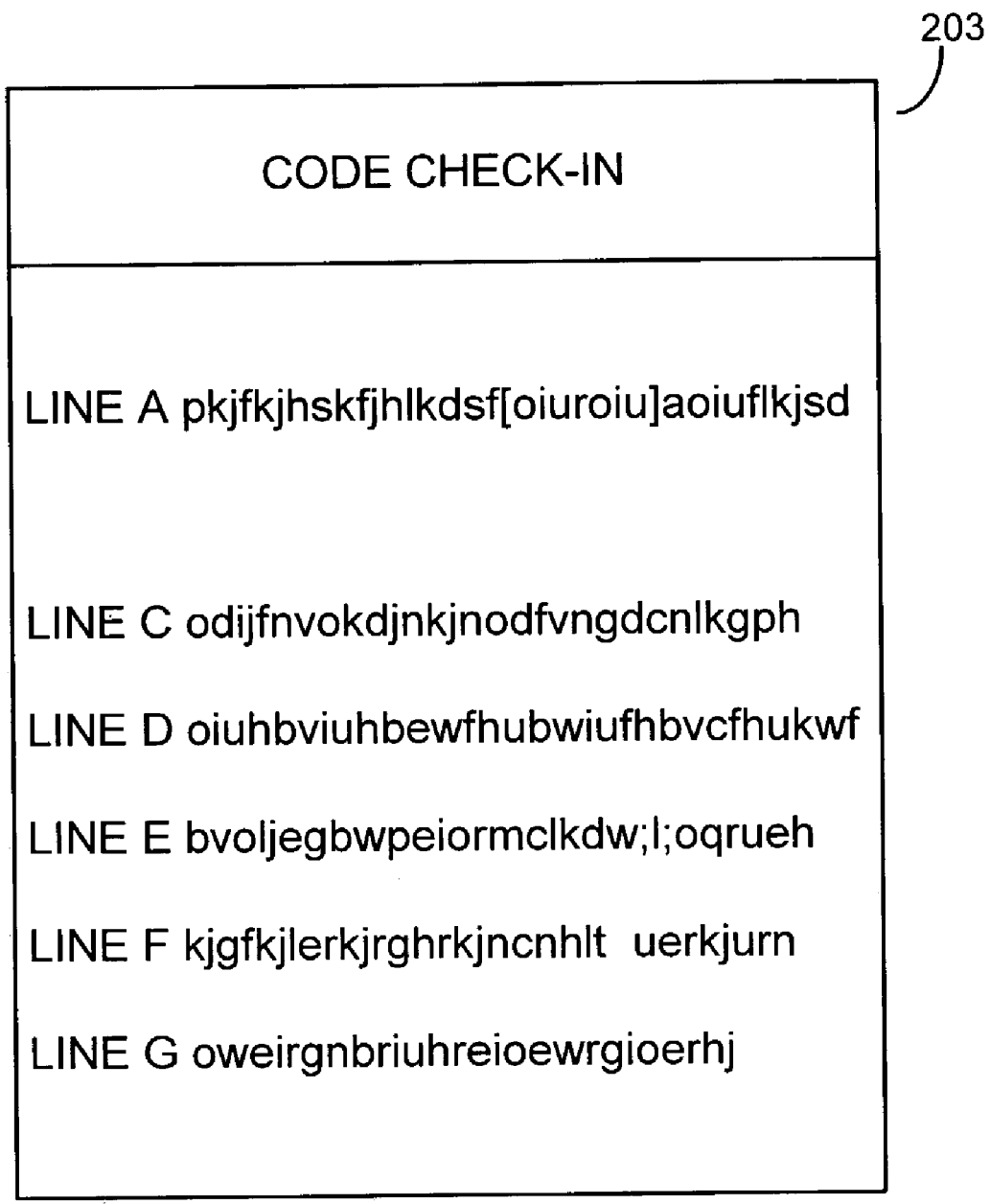
Figure 2C:
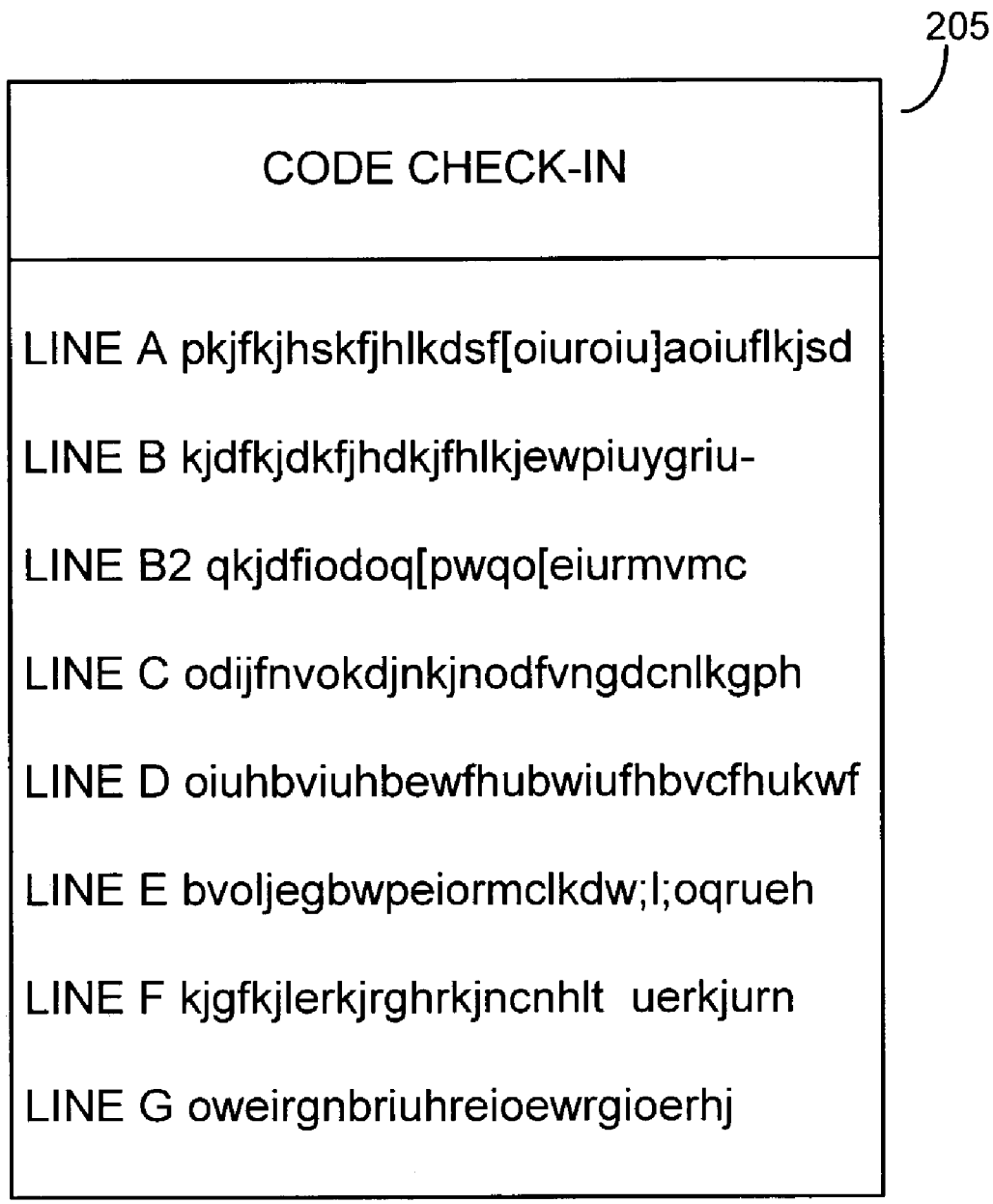
Figure 2D:
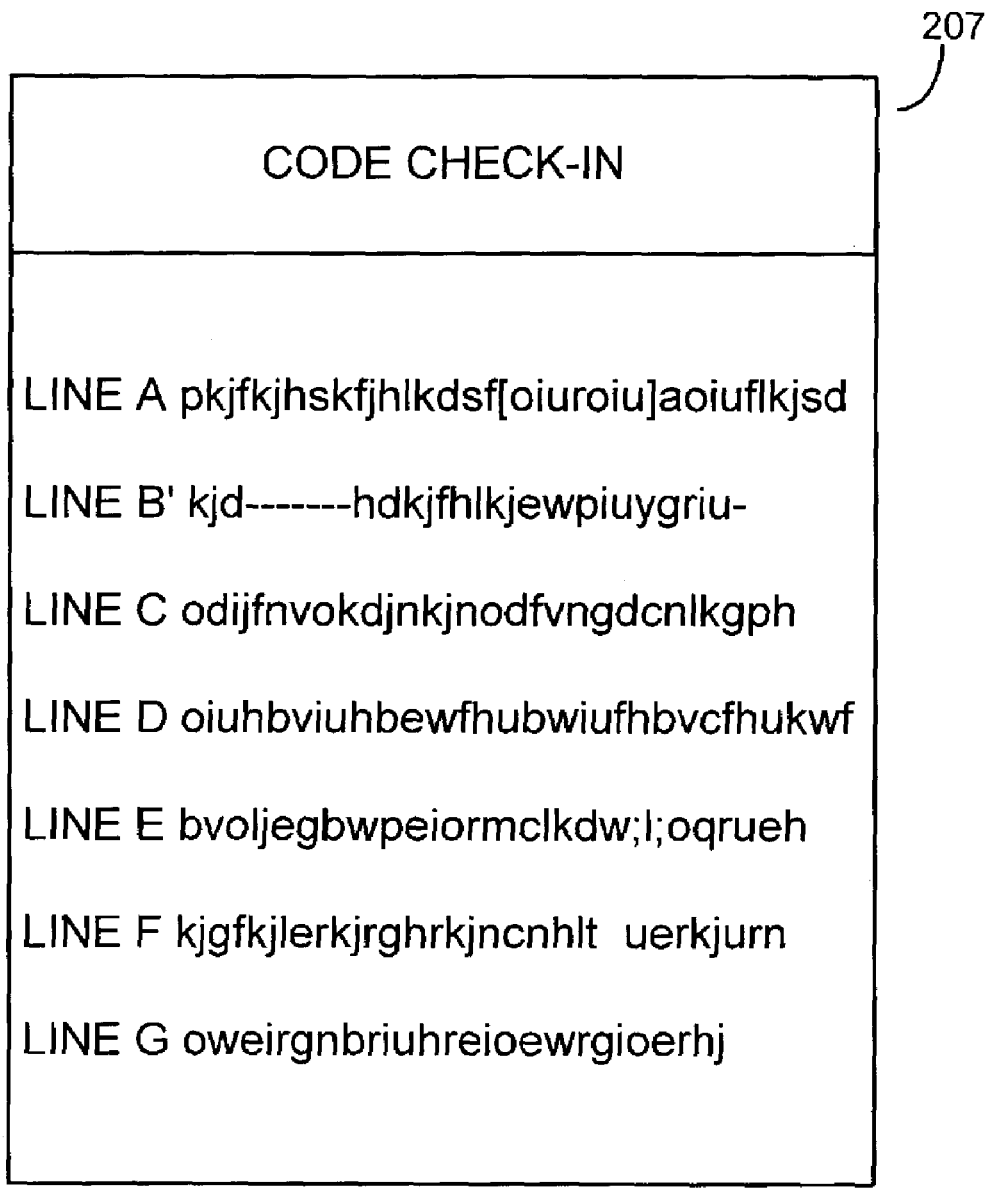

The simplified diagram of FIG. 2A shows example code 201 having lines A–G. Although a body of code will typically have a much greater number of lines, the example lists only 7 lines for simplicity. The illustrated sample code corresponds to the state of the code at check-in number 1, such as at an initial check-in prior to any bug fix work, or other prior check-in. Subsequently, the code is modified and checked in again at check-in number 2. The sample code segments given in FIGS. 2B–D show possible states of the code upon consecutive subsequent check-ins. For example, in the sample code 203 of FIG. 2B, line "B" has been deleted, whereas in the sample code 205 of FIG. 2C, line "B$_2$" has been added after line "A." In the sample code 207 of FIG. 2D, line "B" has been modified to form line "B'." Assuming that the changes of FIGS. 2B–D were made to correct defects present in the code 201 at a prior check-in, they can be used to evaluate coding quality according to an embodiment of the invention as will be described hereinafter.

In an embodiment of the invention, the number of defective lines in a body of code is divided by the number of opportunities to create such defects, for example the total number of lines in the code body having the defective lines, in order to derive a measure of the rework required (a defect measure or coding quality measure), and hence the skills or productivity of the developer who drafted the code. As will be appreciated, the nature of the described system typically makes it difficult to "game" or manipulate in the developer's favor in many implementations. This is primarily because, although the unwarranted dispersal of code over multiple lines does not significantly increase the possibility of a bug, it does increase both the number of opportunities for defective lines and the total number of defective lines that will result from any bug.

In an embodiment, the following expression can be used to derive a measure of the number of defects relative to the number of opportunities for such:

$$z = \left( \sum_{BugFixChkIn0}^{AllBugFixChkIns} ((\# \ linesadded) + (\# \ linesdeleted) + 2*(\# \ lineschanged)) \right) / \left( \sum_{ChkIn0}^{AllChkIns} ((\# \ linesadded) + (\# \ linesdeleted) + 2*(\# \ lineschanged)) \right)$$

The quotient z gives a normalized measure of coding productivity. Essentially, the numerator of the above expression yields an indication of the number of defective lines of code contained in a body of code under analysis. The denominator on the other hand yields an indication of the number of opportunities for such defects. It can be seen for example that in the case that no lines of code are deleted, added, or changed throughout check-ins for bug fix reasons, then the measure yields zero, corresponding to code having no rework due to defects.

Before using the foregoing expression to derive a probabilistic error value such as a sigma value as used by the Six Sigma approach, the examples of FIGS. 2A–D will be evaluated to determine an approximate percentage error value, or quality or defect measure, according to the foregoing expression. First the code of FIG. 2B will be analyzed by reference to the initial check-in code of FIG. 2A.

If the initial check-in, as illustrated by FIG. 2A, added seven lines of code, then the first quantity in the denominator of the above expression is 7. The second and third quantities in the denominator of the above expression are 0, since zero lines have been deleted or changed. Since check-in 2A involves only the addition of new code and not a bug fix, all three quantities in the numerator would be zero. Thus, the metric at the completion of the first check-in (2A) is zero.

In the second check-in (2B), one line was deleted to correct an error in the code. The second quantity in both the numerator and denominator is incremented by 1. This means that the numerator will now be 1 and the denominator will be 7+1=8. Thus, the result of the metric will be ⅛=0.125. This can be read to mean that approximately 12.5% of the code to date (as of the check-in in FIG. 2B) has been defective.

Similarly, the check-ins of FIGS. 2C–D can also be evaluated in conjunction with previous check-ins to derive a cumulative developer productivity measure. With respect to FIG. 2C, two lines have been added since check-in 2B, none changed, and none deleted. Thus the denominator of the foregoing expression is 10, i.e. 8 (from the previous check-in) plus 2+0+2*0. Assuming these two lines were added to correct another error, the numerator is also incremented by 2, i.e. 1 (from the previous check-in) plus 1+0+2*0=3. Thus, the quotient is now 3/10 or 0.3.

With respect to FIG. 2D, one line has been changed, and no lines expressly added or deleted. In this situation, the change may also be viewed as a deletion of the original line coupled with the addition of a new line. Both cases will be analyzed. Viewing the change as simply one line that is changed, with no deletions or additions, the denominator is 12, i.e. 10 (from the previous check-in) plus 0+0+2*1. Again, assuming the line was changed to correct an error, in this case, the numerator is now 5, i.e. 3 (from the previous check-in) plus 0+0+2*1. The resultant quotient z is 5/12 or approximately 0.417. Now, viewing the change rather as the deletion of the original line followed by the addition of the new line, the denominator is 12, i.e. 10 (from the previous check-in) plus 1+1+2*0. Similarly, the numerator is 5, i.e. 3 (from the previous check-in) plus 1+1+2*0. The resultant quotient z is still 5/12 or approximately 0.417. Thus, whether the modification of a line is viewed as one act (a modification) or two (a deletion and an addition), the resulting productivity measure is the same, eliminating any complications caused by disparities in the treatment of line modifications by differencing routines.

To derive a sigma value from the quality measure, a standard z table may be used. Alternatively, an approximation of the sigma value can be obtained from the following formula as will be appreciated by those of skill in the art:

$$\sigma \approx \sqrt{29.37 - 2.221 * \ln((1.0e6)(z))} - 0.6594.$$

From this it can be seen that the σ values for the z values derived above (0.125, 0.3, and 0.417) are 1.158, 0.507, and 0.133 respectively. To derive the value ordinarily used by the Six Sigma initiative, 1.5 may be added to these values to obtain 2.658, 2.007, and 1.633 respectively.

Figure 3:
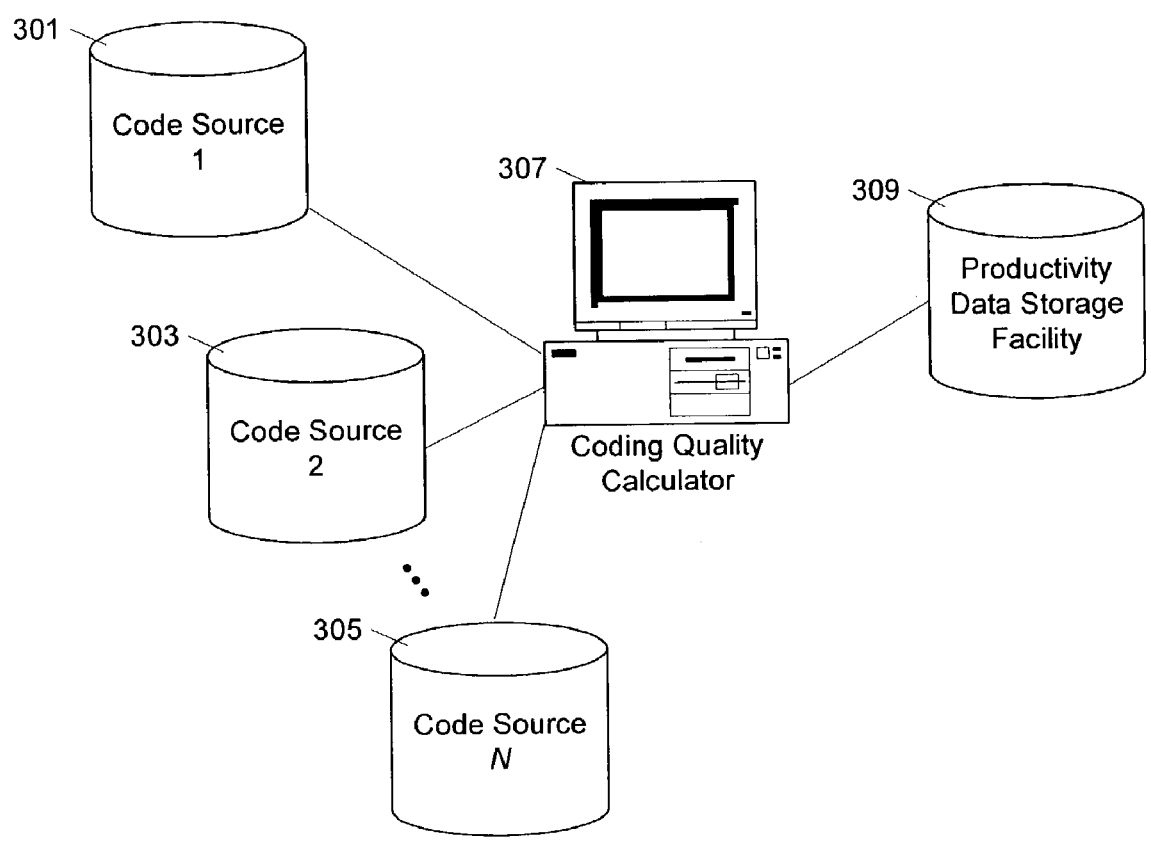
FIG. 3 is a schematic diagram showing an architecture according to an embodiment of the invention for analyzing code to derive a defect measure.

FIG. 3 illustrates in simplified schematic form the computing architecture used in an embodiment of the invention to gather, calculate, and store the developer quality measure and related data. Typically, in a development environment comprising a number of distinct development groups, each development group stores distinct versions of its code on a single storage facility or group of storage facilities, as illustrated by each of code sources 301, 303, 305. Thus, as will be appreciated by those of skill in the art, each code source 301, 303, 305 may represent either a single storage device or a logical cluster of such devices.

The quality calculations, such as those described above according to an embodiment of the invention, are executed at a central location, such as computing machine 307. In this embodiment, machine 307 has access to the code stored at each code source, and uses the stored code in its calculations. Once the coding quality calculations have been performed, the results are preferably centrally stored, so that those in need of such information, such as management personnel and so forth, may easily have access. Thus, productivity data storage facility 309 may receive such data from the coding quality calculator 307, and may subsequently make such data available to authorized parties. Note that in an embodiment of the invention, the productivity data storage facility 309 is a component of the machine comprising the coding quality calculator 307. Further, those of skill in the art will appreciate that the illustrated architecture is an example, and that the invention is not limited thereto. For example, two or more of the code storage, analysis, and result storage steps may alternatively be implemented on a shared machine.

Figure 4:
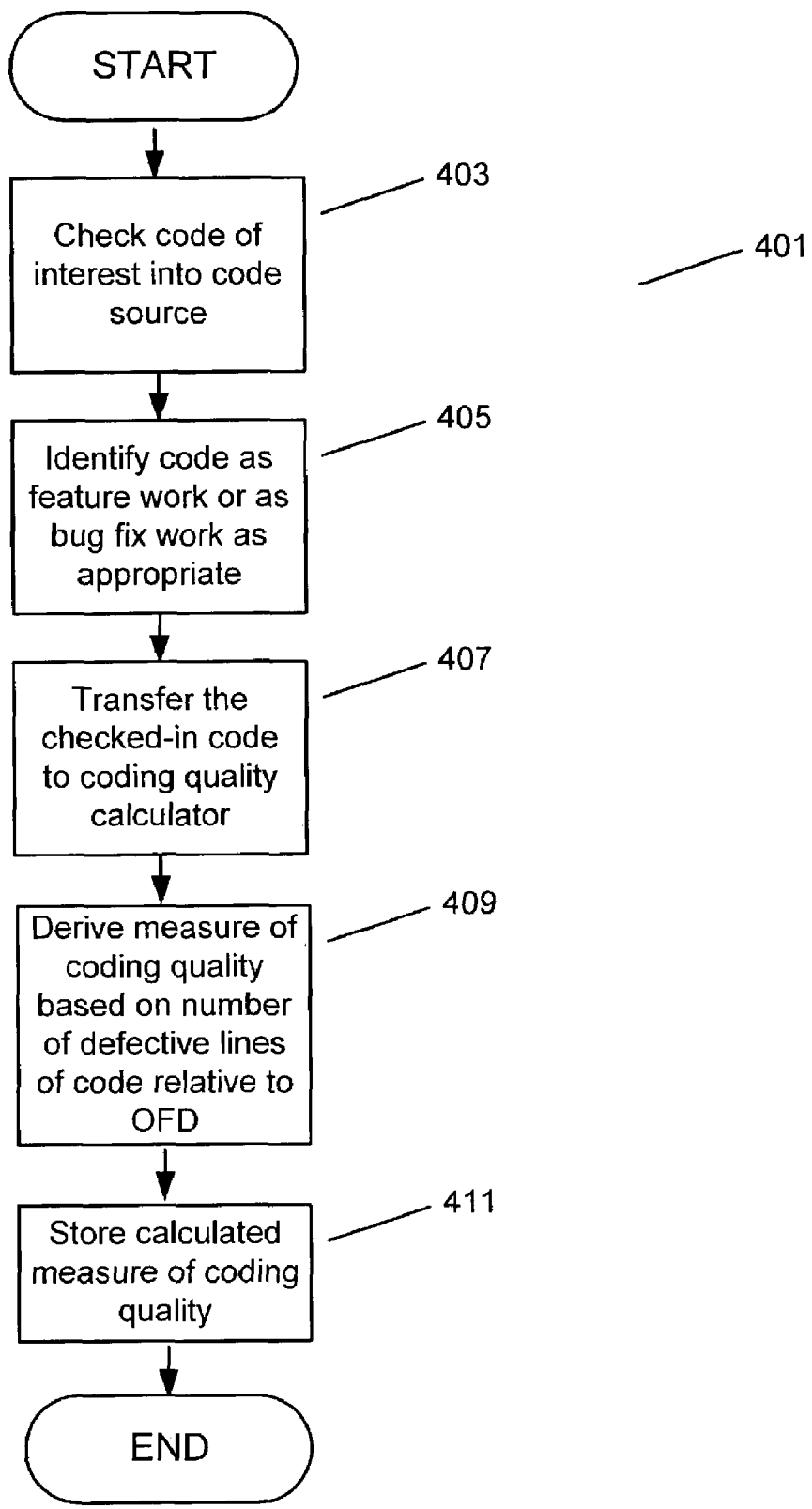
FIG. 4 is a flow chart illustrating the production of a defect measure relative to measured code according to an embodiment of the invention.

Flow chart 401 of FIG. 4 illustrates in greater detail an exemplary process used to evaluate coding quality and hence developer productivity. At step 403, the code of interest is checked into a code source, such as a centralized server for a developer group (see code sources 301, 303, 305). Generally such check-ins occur several times before a final version of the code is to be made available to consumers for use or to another group for further processing. At step 405, which may occur as part of step 403, or which alternatively may be a separate step, the code is identified, such as by a party performing the check-in. For example, the code may be characterized as feature work or as bug fix work. In an embodiment of the invention, feature work that is checked in is not evaluated for defects, but does contribute to the opportunities for defects relative to the next bug fix check-in. In this regard, see the above expression for calculating a measure of the number of defects relative to the number of opportunities, and in particular the denominator of that expression. Note that the party performing the check-in is not required to specify error or bug severity in an embodiment of the invention, since bugs that are severe enough to change will be fixed, and since in fixing any bugs, the severity of the bug will be reflected in the number of defective lines, to be calculated hereinafter.

In step 407, the newly checked in code is transferred to the machine being used to perform the coding quality analysis. Such transfer may be either pulled, such as by the transferee based on a registration by the transferor, or pushed, such as by the transferor. In an embodiment of the invention wherein a single machine is used both to receive the check-in and to produce coding quality data, the transfer step may be omitted entirely. Note that the calculations discussed above and to be discussed hereinafter are cumulative in certain embodiments of the invention, and so there may be other prior check-ins that must also be transferred depending upon whether they have already been transferred and if so, upon whether they or the intermediate derived data were stored. In step 409, the measure of coding quality is derived based on the number of defective lines of code (a defect count) relative to an evaluation of the total number of opportunities for such defects (an opportunity for defect count). In an embodiment of the invention, this measure is calculated as set forth above, and as discussed in greater detail in the flow chart of FIG. 5.

Finally, at step 411, the measure of coding quality is stored. Note that such storage may be in a separate machine than either the check-in recipient or the calculating machine, however in an alternative embodiment of the invention, one or more of the above are combined. Furthermore, although the measure of coding quality is based on a cumulative calculation, there is no need in every case to discard previously calculated measures. Indeed, it is usually desirable to evaluate a sequence of quality measures over time to track improvement or degradation in the code development process. In such a situation, it is preferable although not required to maintain any relevant prior quality measurement data at the same site (or a site accessible thereto) as the most recent such data.

Figure 5:
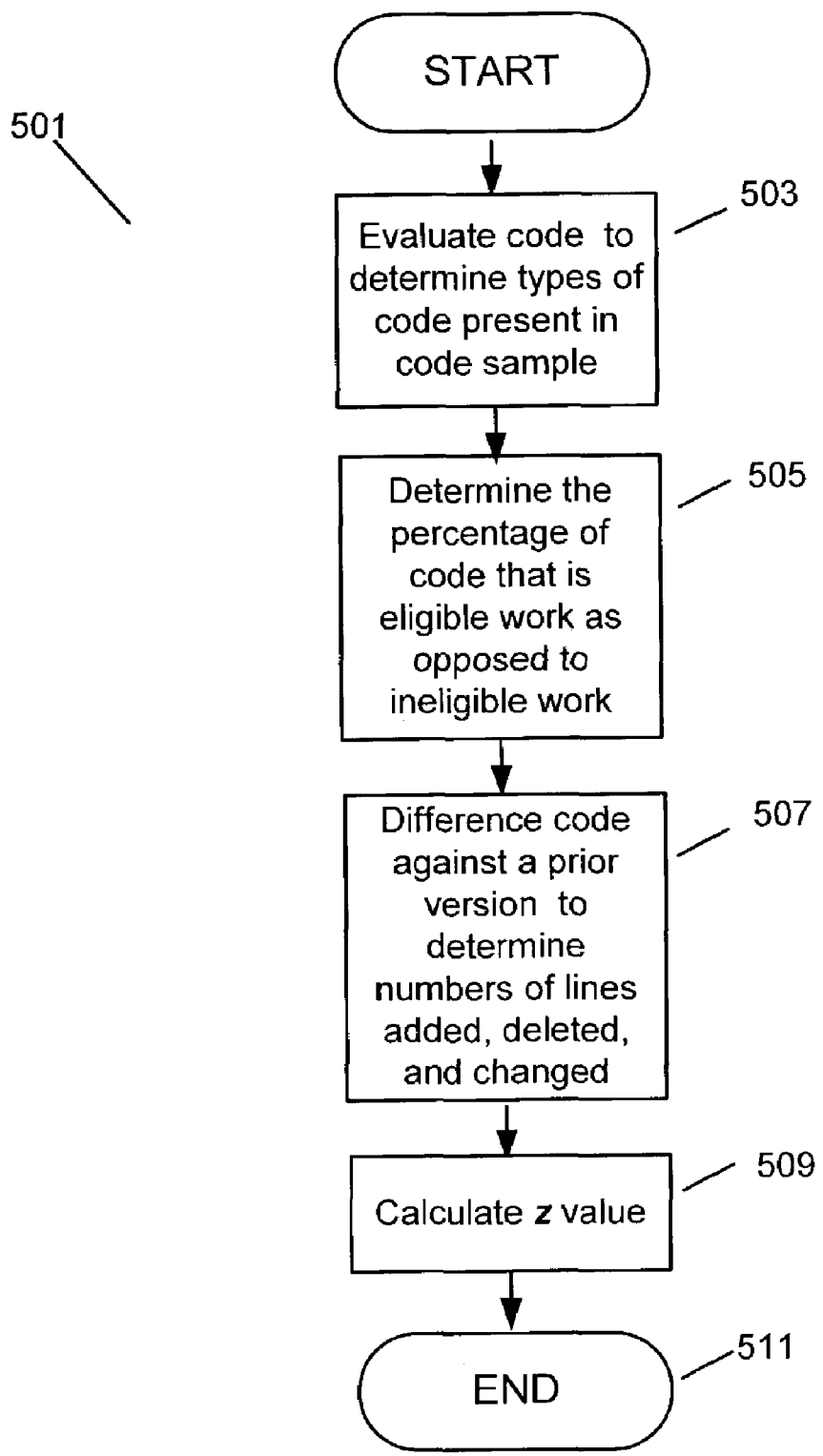
FIG. 5 is a flow chart illustrating in greater detail the steps for production of a defect measure in an embodiment of the invention.

The coding quality measurement process is shown in greater detail in FIG. 5. In particular, the flow chart 501 of FIG. 5 illustrates the steps taken to calculate an appropriate z value as discussed above. In step 503, the code is evaluated to determine what types of code are represented in the code check-in or check-ins. For example, a check-in may be comprised entirely of ineligible code such as feature work, eligible code such as bug fix work, or a mixture of the two. Other examples of potentially ineligible code include automated check-ins that do not have human-directed changes, check-ins directed to replacing dummy code with real code such as when two pieces of separately developed code are finally spliced together, etc. Generally, the decision as to which types of code should be counted in evaluating the number of defects is a policy decision that may be made as appropriate by management personnel based on their specific goals and desires.

Ineligible code will generally be used in the summation equation above to supplement the denominator, but will not affect the numerator. Although it is preferred to have single code type check-ins, such is not always practical. The evaluation of the code in step 503 may be accomplished automatically via a characterization tool, such as by reference to a registry of pending feature work and/or bug fix work, or by way of a prior manual characterization such as that in step 405 of FIG. 4. Note that when multiple check-ins are being evaluated, each may be characterized at its respective check-in time rather than just prior to a coding quality calculation.

Next, the process flows from step 503 to step 505, whereat a determination is made as to the percentage of code that is bug fix or other eligible work as opposed to feature work or other ineligible work. In an embodiment of the invention, this determination is made based on user input received at check-in, such as in step 405 of FIG. 4. As above, the respective percentage for one or more check-ins may be determined at or around the respective check-in times rather than just prior to a coding quality calculation.

At step 507, each check-in of interest is differenced against a prior version of the code, such as from the immediately prior check-in or other selected check-in, to determine the numbers of lines added, deleted, and/or changed. Note that in an embodiment of the invention, it is not critical that a changed line be distinguished from a combined deleted line and added line, since the quality evaluation formula, such as that set forth above, preferably accommodates either and gives substantially the same result regardless. In the differencing operation, certain types of material are preferably ignored. For example, comments, sections or lines of code that are commented out or otherwise inactivated, blank lines, string constants, etc. may be ignored depending upon the implementer's goals and preferences.

At step 509 an appropriate z value is calculated. The calculation is preferably performed according to the summation formula given above for z. If the period for evaluation comprises only the present check-in and the prior check-in, then the z value can be simply calculated from the difference information. If on the other hand the period for evaluation includes multiple prior check-ins, then the sums used to calculate z may be calculated by repeating all the required prior differences, by using stored prior differences, or by using a stored prior numerator and denominator.

The z value preferably accounts for the percentage of the code that is eligible at each relevant check-in, as determined in step 505. In particular, in an embodiment of the invention, the eligibility percentage determined in step 505 for each relevant check-in is preferably used as a multiplier for the defect sum (the numerator contribution of the above summation expression due to a particular check-in) for that check-in prior to summing of the defect sums for all check-ins of interest to derive the z value numerator when multiple prior versions are included in the z calculation. Finally, the process terminates at step 511.

It will be appreciated that a new method and system for coding quality evaluation and developer productivity have been disclosed herein. In particular, in certain embodiments of the invention, a line of code is viewed as an opportunity for defect, with a defective line of code representing a distinct defect without reference to bugs. In view of the many possible embodiments to which the principles of this invention may be applied, it should be recognized that the embodiments described herein with respect to the drawing figures are meant to be illustrative only and should not be taken as limiting the scope of invention. For example, although a formula has been specified herein for calculating a measure of coding quality, the given formula is exemplary only, and those of skill in the art will be able to devise other expressions to achieve the same result without undue experimentation given the teachings set forth herein. Furthermore, those of skill in the art will recognize that the elements of the illustrated embodiments shown in software may be implemented in hardware and vice versa and that the illustrated embodiments can be modified in arrangement and detail without departing from the spirit of the invention. Therefore, the invention as described herein contemplates all such embodiments as may come within the scope of the following claims and equivalents thereof.

We claim:

1. A method executable at least in part by a computer-based system for evaluating the quality of a code development process relative to a present version of computer code, the method comprising:
   determining a defect count by comparing a present version of computer code having code lines to a prior version of the computer code having code lines to determine a difference between the code lines in the present version of the computer code and the code lines in the prior version of the computer code;
   determining an opportunity for defect count based at least on the number of code lines in the prior version of the computer code, the opportunity for defect count being determined at least in part by a sum of the number of lines added or deleted in the prior version of the computer code, the number of lines added or deleted in the present version of the computer code, twice the number of lines changed in the prior version of the computer code, and twice the number of lines changed in the present version of the computer code; and
   deriving a quality measure relative to the development of the current version of the computer code by forming a quotient of the defect count and the opportunity for defect count.

2. The method according to claim 1, wherein the difference between the code lines in the present version of the computer code and the code lines in the or version of the computer code comprises an indication of the number of lines added in the present version of the computer code relative to the prior version of the computer code, the number of lines deleted in the present version of the computer code relative to the prior version of the computer code, and the number of lines changed in the present version of the computer code relative to the prior version of the computer code.

3. The method according to claim 2, wherein determining a defect count further comprises calculating a defect sum comprising the sum of the number of lines added in the present version of the computer code, the number of lines deleted in the present version of the computer code, and twice the number of lines changed in the present version of the computer code relative to the prior version of the computer code.

4. The method according to claim 3, wherein in determining a defect count, a line that is moved is treated as one line added and one line deleted.

5. The method according to claim 3, wherein determining a defect count further comprises multiplying the defect sum by an eligibility percentage, wherein the eligibility percentage reflects the percentage of the difference between the code lines in the present version of the computer code and the code lines in the prior version of the computer code that is due to error fixing.

6. The method of claim 1, further comprising deriving a standard deviation measure based on the calculated quality measure.

7. The method according to claim 2, wherein a plurality of the lines added, deleted, or changed in the present version of the computer code relative to the prior version of the computer code are attributable to a single functional problem that was fixed in the present version of the computer code relative to the prior version of the computer code.

8. A method executable at least in part by a computer-based system for computing a defect measure for the development of a current version of computer code derived from at least one past version of the computer code comprising:
- determining the number of lines added, deleted, or changed in the at least one past version of the computer code relative to a first prior state of the computer code;
- determining the number of lines added, deleted, or changed in the current version of the computer code relative to a second prior state of the computer code;
- forming an opportunity sum comprising the sum of the number of lines added or deleted in the at least one past version of the computer code, the number of lines added or deleted in the current version of the computer code, twice the number of lines changed in the at least one past version of the computer code, and twice the number of lines changed in the cutrent version of the computer code;
- identifying a set of defect-curing code versions from the current version of the computer code and the at least one past version of the computer code;
- for each defect-curing code version, determining the number of lines added, deleted, or changed in that version of the computer code relative to a respective prior state of the computer code;
- forming a defect sum comprising the sum of the number of lines added or deleted in each defect-curing code version of the computer code, and twice the number of lines changed in each defect-curing code version of the computer code; and
- computing a defect measure as the quotient of the defect sum and the opportunity sum.

9. The method according to claim 8, wherein a defect-curing code version is a version in which at least one functional problem was fixed.

10. The method according to claim 8, further comprising multiplying the defect sum by an eligibility percentage, wherein the eligibility percentage is less than one.

11. The method according to claim 8, wherein the set of defect-curing code versions omits any code version that does not implement a correction for erroneous coding in a prior version.

12. The method of claim 8, further comprising deriving a standard deviation measure based on the calculated defect measure.

13. The method according to claim 8, wherein a plurality of the lines added, deleted, or changed in the current version of the computer code relative to the second prior state of the computer code are attributable to a single functional problem that was fixed in the current version of the computer code relative to the second prior state of the computer code.

14. A system for improving a computer code development process relative to a particular body of computer code comprising:
- a code source from which the particular body of computer code is available;
- a productivity calculator communicably linked to the code source for retrieving the particular body of computer code and at least one prior version of the particular body of computer code and for calculating a defect measure for the particular body of computer code relative to the at least one prior version of the particular body of code based on line differences between the particular body of computer code and the at least one prior version of the particular body of computer code, wherein the defect measure is calculated at least in part by:
  - forming a defect sum comprising a sum of a number of lines added or deleted in a current version of the particular body of the computer code and twice a number of lines changed in the current version of the computer code, relative to the prior version of the computer code;
  - forming an opportunity sum comprising a sum of a number of lines added or deleted in the rior version of the computer code, a number of lines added or deleted in a current version of the computer code, twice a number of lines changed in the prior version of the computer code, and twice a number of lines changed in the current version of the computer code; and
  - forming a quotient of the defect sum and the opportunity sum; and
- a productivity data storage facility communicably linked to the productivity calculator for storing the calculated defect measure.

15. The system according to claim 14, wherein at least two of the code source, quality calculator and productivity data storage facility are co-located on a common computing device.

16. The system according to claim 14, further comprising a second code source commumeably linked to the quality calculator to make available thereto a second body of code for calculation of a second defect measure corresponding to the second body of code, wherein the productivity data storage facility further stores the second defect measure.

17. A computer-readable storage medium having thereon computer-executable instructions for performing a method for computing a defect measure for the development of a current version of computer code derived from at least one past version of the computer code, the method comprising:
- determining the number of lines added, deleted, or changed in the at least one past version of the computer code relative to a first prior state of the computer code;
- determining the number of lines added, deleted, or changed in the current version of the computer code relative to a second prior state of the computer code;
- forming an opportunity sum comprising the sum of the number of lines added or deleted in the at least one past version of the computer code, the number of lines added or deleted in the current version of the computer code, twice the number of lines changed in the at least one past version of the computer code, and twice the number of lines changed in the current version of the computer code;
- identifying a set of defect-curing code versions from the current version of the computer code and the at least one past version of the computer code;
- for each defect-curing code version, determining the number of lines added, deleted, or changed in that version of the computer code relative to a respective prior state of the computer code;
- forming a defect sum comprising the sum of the number of lines added or deleted in each defect-curing code version of the computer code, and twice the number of lines changed in each defect-curing code version of the computer code; and
- computing a defect measure as the quotient of the defect sum and the opportunity sum.

18. The computer-readable storage medium according to claim 17, wherein a defect-curing code version is a version in which at least one functional problem was fixed.

19. The computer-readable storage medium according to claim 17, wherein the method further comprises multiplying the defect sum by an eligibility percentage, wherein the eligibility percentage is less than one.

20. The computer-readable storage medium according to claim 17, wherein the set of defect-curing code versions omits any code version that does not implement a correction for erroneous coding in a prior version.

21. The computer-readable storage medium according to claim 17, wherein the method further comprises deriving a standard deviation measure based on the calculated defect measure.

22. The computer-readable storage medium according to claim 17, wherein a plurality of the lines added, deleted, or changed in the current version of the computer code relative to the second prior state of the computer code are attributable to a single bug that was fixed in the current version of the computer code relative to the second prior state of the computer code.

* * * * *